(12) United States Patent
Wetzel et al.

(10) Patent No.: US 9,874,282 B2
(45) Date of Patent: Jan. 23, 2018

(54) SLIDE VALVE

(71) Applicant: Robert Bosch GmbH, Stuttgart (DE)

(72) Inventors: Gerhard Wetzel, Korntal-Muenchingen (DE); Guenter Escher, Oberstdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 76 days.

(21) Appl. No.: 14/896,536

(22) PCT Filed: Mar. 11, 2014

(86) PCT No.: PCT/EP2014/054679
§ 371 (c)(1),
(2) Date: Dec. 7, 2015

(87) PCT Pub. No.: WO2014/195035
PCT Pub. Date: Dec. 11, 2014

(65) Prior Publication Data
US 2016/0123478 A1 May 5, 2016

(30) Foreign Application Priority Data

Jun. 6, 2013 (DE) .......................... 10 2013 210 500

(51) Int. Cl.
*F16K 11/07* (2006.01)
*F16K 3/26* (2006.01)
*F16H 61/02* (2006.01)

(52) U.S. Cl.
CPC ......... *F16K 3/262* (2013.01); *F16H 61/0276* (2013.01); *F16K 11/07* (2013.01); *F16K 11/0716* (2013.01); *F16H 2061/0279* (2013.01)

(58) Field of Classification Search
CPC ...... F16K 11/07; F16K 11/0716; F16K 3/262; F16H 61/0276; F16H 2061/0279
See application file for complete search history.

(56) References Cited

U.S. PATENT DOCUMENTS

| 2,485,504 A | 10/1949 | Myles |
| 2,764,181 A | 9/1956 | Richolt |
| 3,698,435 A | 10/1972 | Evans |
| 4,535,821 A * | 8/1985 | Anderson ............. B01F 5/0413 137/625.37 |

(Continued)

FOREIGN PATENT DOCUMENTS

| DE | 102008042624 A1 | 4/2010 |
| DE | 10 2010 041 124 | 3/2012 |

(Continued)

*Primary Examiner* — Matthew W Jellett
*Assistant Examiner* — Christopher Ballman
(74) *Attorney, Agent, or Firm* — Norton Rose Fulbright US LLP; Gerard Messina (57) ABSTRACT

A slide valve is described, in particular, for an automatic transmission for motor vehicles. The slide valve includes a valve slide displaceable in a sliding channel and at least two adjacent connecting channels. The sliding channel and the valve slide are configured so that the valve slide in an opened slide position establishes a fluid connection between the two adjacent connecting channels, and the valve slide in the opened slide position is guided in a section of the sliding channel between the adjacent connecting channels.

18 Claims, 10 Drawing Sheets

(56) References Cited

U.S. PATENT DOCUMENTS

| | | | | |
|---|---|---|---|---|
| 5,261,147 A | * | 11/1993 | Wood, III | B23Q 7/1431 |
| | | | | 198/346.1 |
| 5,297,777 A | * | 3/1994 | Yie | B05B 1/3046 |
| | | | | 251/214 |
| 6,076,552 A | * | 6/2000 | Takahashi | F15B 13/0402 |
| | | | | 137/625.3 |
| 6,478,050 B2 | * | 11/2002 | Park | F16H 61/0276 |
| | | | | 137/625.69 |
| 6,702,024 B2 | * | 3/2004 | Neugebauer | E21B 49/081 |
| | | | | 166/169 |
| 2004/0000658 A1 | * | 1/2004 | Wayman | F16K 11/07 |
| | | | | 251/321 |
| 2008/0035224 A1 | * | 2/2008 | Tyer | F15B 13/0402 |
| | | | | 137/625.34 |
| 2008/0105307 A1 | * | 5/2008 | Andoh | F16K 11/07 |
| | | | | 137/495 |
| 2010/0084589 A1 | | 4/2010 | Sen et al. | |
| 2010/0123092 A1 | * | 5/2010 | Kokubo | F16K 11/07 |
| | | | | 251/129.01 |

FOREIGN PATENT DOCUMENTS

| | | |
|---|---|---|
| DE | 10 2011 087 546 | 2/2013 |
| DE | 10 2011 0806 | 2/2013 |
| JP | 01116278 U | 8/1989 |
| JP | H0341286 U | 2/1991 |
| JP | H08192761 A | 7/1996 |
| WO | WO 2010/108871 | 9/2010 |

* cited by examiner

SLIDE VALVE

FIELD OF THE INVENTION

The present invention relates to a slide valve, in particular for an automatic transmission for motor vehicles.

BACKGROUND INFORMATION

A slide valve according to the related art has a valve slide, which is displaceable in a sliding channel. It is also known that connecting channels open into a sliding channel or are connected to it.

A slide valve is discussed in DE 10 2010 041 124 A1, in which a connection bore extends beyond a sliding channel. A first guide section having a control edge is assigned to the connection bore and has at least one annular groove in its lateral outer surface.

Patent document DE 10 2011 087 546 A1 relates to a slide valve including a valve slide capable of being acted upon by an actuator. The valve slide includes two recesses extending axially, radially circumferentially and situated next to control sections.

SUMMARY OF THE INVENTION

The problem underlying the present invention is solved by a slide valve as described herein.

Because a valve slide in an opened slide position establishes a fluid connection between two adjacent connecting channels and the valve slide in the opened slide position is guided in an area of a sliding channel between the adjacent connecting channels, it is possible to reduce the mechanical friction, as well as the viscous friction. In addition, it is also possible to implement slide valves having smaller dimensions. The advantage achieved by the guiding of the valve slide in the area of the sliding channel between the adjacent connecting channels is, in particular, that additional guide sections may be omitted. On the whole, a reduction of the diameter of the valve slide and a reduction of the length of the valve slide are possible. The slide valve may also be advantageously implemented with no additional sleeve. Minimal tolerances with respect to the position of the bores also result. Undercuts in the housing may also be avoided. A reduction of the manufacturing steps is also possible.

An opening section of the valve slide for the opened slide position advantageously includes a cross-sectional rebound to the fluid connection in the area of the sliding channel between the adjacent connecting channels. Fluid between adjacent connecting channels may be replaced via the cross-sectional rebound.

In another advantageous specific embodiment, the opening section of the valve slide for the opened slide position includes a guide section for guiding the valve slide in the sliding channel. The guide section transitions essentially continuously into a guide outer surface of an adjacent closing section of the valve slide. The advantage achieved by this is that the guide is essentially uninterrupted in the area of control edges or bores. This prevents, in particular, a canting of the valve slide and the service life of the slide valve is increased.

In one advantageous refinement, adjacent cross-sectional rebounds are spaced equally far apart from one another and/or adjacent guide sections are spaced equally far apart from one another.

Another refinement relates to a point symmetry or an axial symmetry in the cross section of the valve slide. As a result of these refinements, the forces radially engaging the valve slide in either case may have minimal effects on the wear and the function of the valve slide, in particular of the entire slide valve.

In one advantageous specific embodiment of the slide valve, one of the connecting channels transverse to a longitudinal axis of the sliding channel, in particular in an area in which the valve slide is situated, has a diameter larger than a cross-sectional diameter of an adjacent section of the sliding channel. The advantage achieved by this is that pressure from the connecting channel is applied to the valve slide in the area of the larger diameter of the connecting channel in such a way that the applied forces are essentially neutralized. This results in advantages with respect to the guiding of the valve slide in the sliding channel, since force is not applied unilaterally to the valve slide in the transverse direction. Furthermore, this dimensioning of the connecting channel has the advantage that, in particular at low temperatures and, therefore, with increased viscosity of the fluid, the connecting channel has no significant throttle effect, as a result of which the slide valve may be dimensioned to be smaller.

In one advantageous specific embodiment, the valve slide includes a passage, which establishes a fluid connection in a pressure buildup position of the valve slide between an operating pressure-connecting channel and a pressure chamber. Pressure may be applied via the pressure chamber to a front surface of the valve slide facing away from an actuator for the valve slide. In this way, a counter-pressure may be advantageously generated in the direction of the actuator and, at the same time, the installation space of the slide valve may be reduced. Because a pressure from the operating pressure-connecting channel may be applied to the front surface, it is possible to produce a closed control loop.

In another advantageous specific embodiment of the slide valve, an opening section of the valve slide for the opened slide position has a diameter change in the longitudinal direction of the valve slide. The diameter change is situated spaced apart from a control edge of the opening section in the longitudinal direction of the valve slide. As a result, the diameter of the valve slide may be advantageously changed without the diameter change assuming the function of a control edge.

In one advantageous specific embodiment of the slide valve, a housing of the slide valve includes a passage, which establishes a fluid connection between an operating pressure-connecting channel and a pressure chamber. Pressure may be applied via the pressure chamber to a front surface of the valve slide facing away from an actuator for the valve slide. In this way, a force counteracting the actuator may be advantageously provided. Because a pressure from the operating pressure-connecting channel may be applied to the front surface, it is possible to produce a closed control loop.

Additional features, possible applications and advantages of the present invention result from the following description of exemplary embodiments of the present invention, which are explained with reference to the drawings.

DETAILED DESCRIPTION

Figure 1:
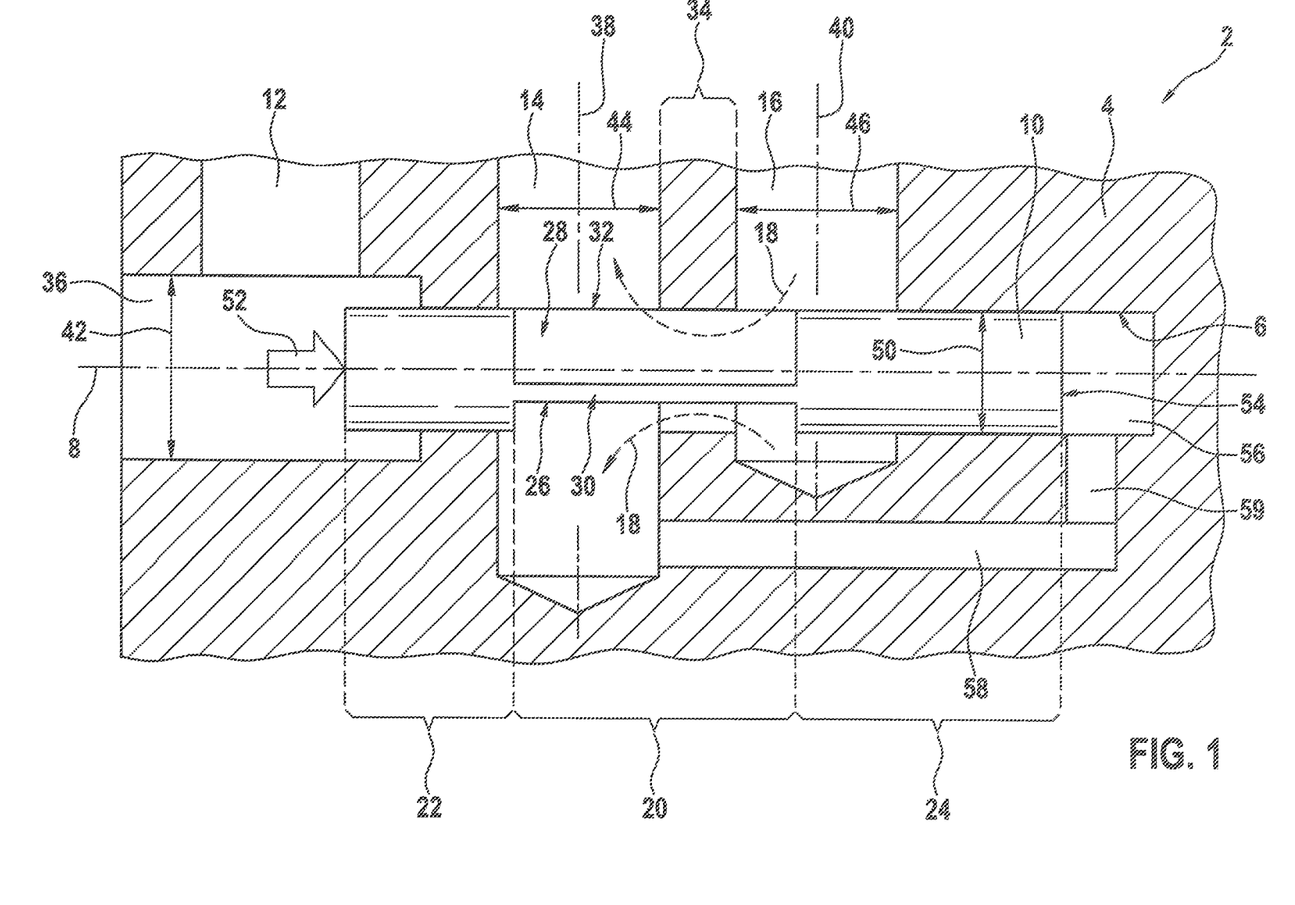
FIG. 1 schematically shows a sectional view of a slide valve in a pressure buildup position.

FIG. 1 schematically shows a sectional view of one first slide valve 2 in a pressure buildup position. Slide valve 2 is provided, in particular, for an automatic transmission for motor vehicles. Slide valve 2 includes a housing 4, depicted in section with cross hatching. A sliding channel 6 is formed in housing 4 of first slide valve 2, which extends at least in sections essentially in cylindrical form along a longitudinal axis 8. A valve slide 10, which in the present case is depicted in side view, is displaceably situated in sliding channel 6.

First slide valve 2 includes a tank-connecting channel 12, an operating pressure-connecting channel 14, and a pressure supply-connecting channel 16, each of which opens into sliding channel 6. Slide valve 2 is supplied with a pressurized fluid via pressure supply-connecting channel 16. Via a displacement of valve slide 10 along longitudinal axis 8, it is possible to bring valve slide 10 into the pressure buildup position shown, in which the fluid flows out of pressure supply-connecting channel 16 into operating pressure-connecting channel 14 in accordance with arrows 18. Tank-connecting channel 12, operating pressure-connecting channel 14 and pressure supply-connecting channel 16 are also generally referred to as a connecting channel.

Valve slide 10 includes an opening section 20 in the longitudinal direction, which is delimited on both sides by a closing section 22 and a closing section 24. Closing sections 22 and 24 have an outer surface, which abuts the inner surface of sliding channel 6 in such a way that closing sections 22 and 24 each seal sliding channel 6 in an essentially fluid-tight manner. Opening section 20 of valve slide 2 includes cross-sectional rebounds 26 and 28, as well as guide sections 30 and 32 explained in greater detail in FIGS. 4 and 5.

Thus, sliding channel 6 and valve slide 10 are configured in such a way that valve slide 10 in the opened slide position forms a fluid connection in accordance with arrows 18 between the two adjacent connecting channels, operating pressure-connecting channel 14 and pressure supply-connecting channel 16, and valve slide 10 in the opened slide position is also guided in an area 34 of sliding channel 6 between adjacent connecting channels 14 and 16.

Cross-sectional rebounds 26 and 28 ensure that an opening into area 34 between pressure supply-connecting channel 16 and operating pressure-connecting channel 14 results. Guide sections 30 and 32 abut against inner surfaces of sliding channel 6 in area 34 in such a way that a guiding of valve slide 10 along longitudinal axis 8 is ensured.

Tank-connecting channel 12 opens into sliding channel 6 via a bore 36. Bore 36 is essentially cylindrically shaped in the area of the valve slide, the longitudinal axis of the cylinder essentially coinciding with longitudinal axis 8 of sliding channel 6. Respective longitudinal axes 38 and 40 of connecting channels 14 and 16 are situated in such a way that respective longitudinal axis 38, 40 extends essentially transversely to longitudinal axis 8 of sliding channel 6. Bore 36 is assigned to tank-connecting channel 12 and has a diameter 42. Operating pressure-connecting channel 14 has a diameter 44. Pressure supply-connecting channel 16 has a diameter 46. Sliding channel 6 has a cross-sectional diameter 50. Hence, connecting channels 12 through 16 have a diameter 42, 44, 46 transverse to longitudinal axis 8 of sliding channel 6, which is larger than cross sectional diameter 50 of the sliding channel. For example, connecting channels 14 and 16 have a diameter 44 and 46 transverse to longitudinal axis 8 of the sliding channel, which is larger than cross-sectional diameter 50 in the area of section 34, which is situated adjacent to connecting channels 14 and 16. For example, diameters 44 and 46 may be determined to be approximately 2.5 mm and cross-sectional diameter 50 to be approximately 1.5 mm. It is understood that bore 36 implemented axially to longitudinal axis 8 may also be formed in the area of connecting channels 14 and 16. It is understood that connecting channel 12 as well as connecting channels 14 and 16 may also be implemented transversely to longitudinal axis 8.

A force is fed to valve slide 10 in accordance with an arrow 52, which originates from an actuator situated opposite to the direction of arrow 52 in a form not shown. The actuator may, for example, be a solenoid or else a hydraulic drive.

A pressure chamber 56 is situated on front face 54 of valve slide 10 opposite to arrow 52, which is formed essentially by front face 54 and sliding channel 6 of housing 4. Two bores 58 and 59 through housing 4 connect operating pressure-connecting channel 14 to pressure chamber 56. In this way, a regulated pressure in operating pressure-connecting channel 14 is channeled into pressure chamber 56, with which this regulated pressure may act on front face 54 and, in particular, on the entire cross sectional surface of the slide. The regulated pressure counteracts, therefore, the force in accordance with arrow 52. Thus, housing 4 of slide valve 2 includes a passage in accordance with bores 58 and 59, the passage establishing a fluid connection between operating pressure-connecting channel 14 and a pressure chamber 56. Thus, a pressure may be applied via pressure chamber 56 to a front surface or front face 54 of valve slide 10 facing away from the actuator for valve slide 10.

Figure 2:
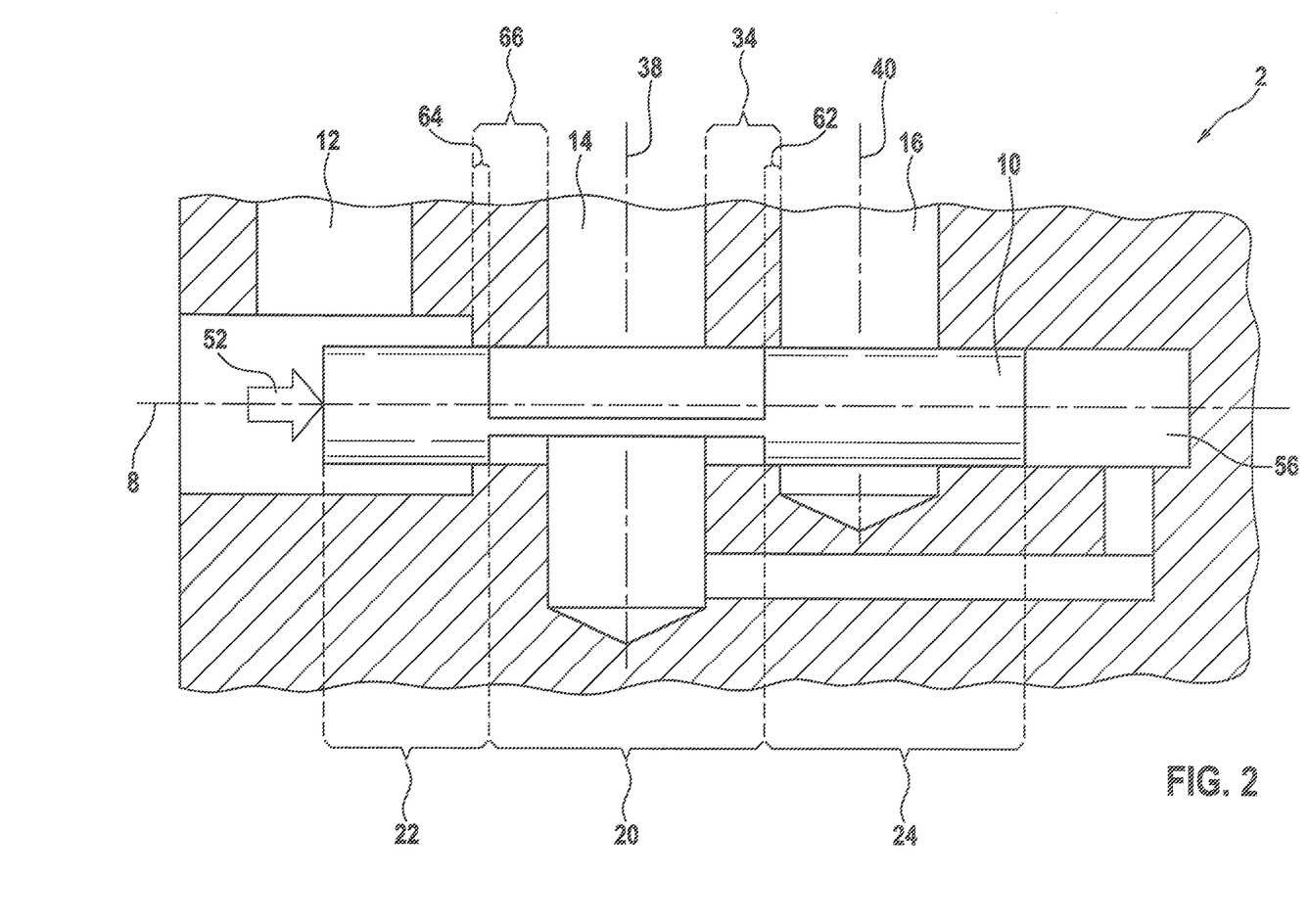
FIG. 2 schematically shows a sectional view of the slide valve from FIG. 1 in a closed position.

FIG. 2 schematically shows first slide valve 2 from FIG. 1 in a sectional view in a closed position. Closing section 24 of valve slide 10 is situated in accordance with a sealing length 62 in section 34 of sliding channel 6 and thereby seals section 34. Sealing section 22 is situated in accordance with a sealing length 64 in a section 66 of sliding channel 6 between tank-connecting channel 12 and operating pressure-connecting channel 14 and seals thereby section 66. It is understood that slide valve 2 may alternatively also be configured, so that either because of the configuration of sliding channel 6 or of valve slide 10, two sealing lengths 64 or 62 never result, and thus, connecting channel 16 is always connected to connecting channel 14 or connecting channel 14 is always connected to connecting channel 12.

Figure 3:
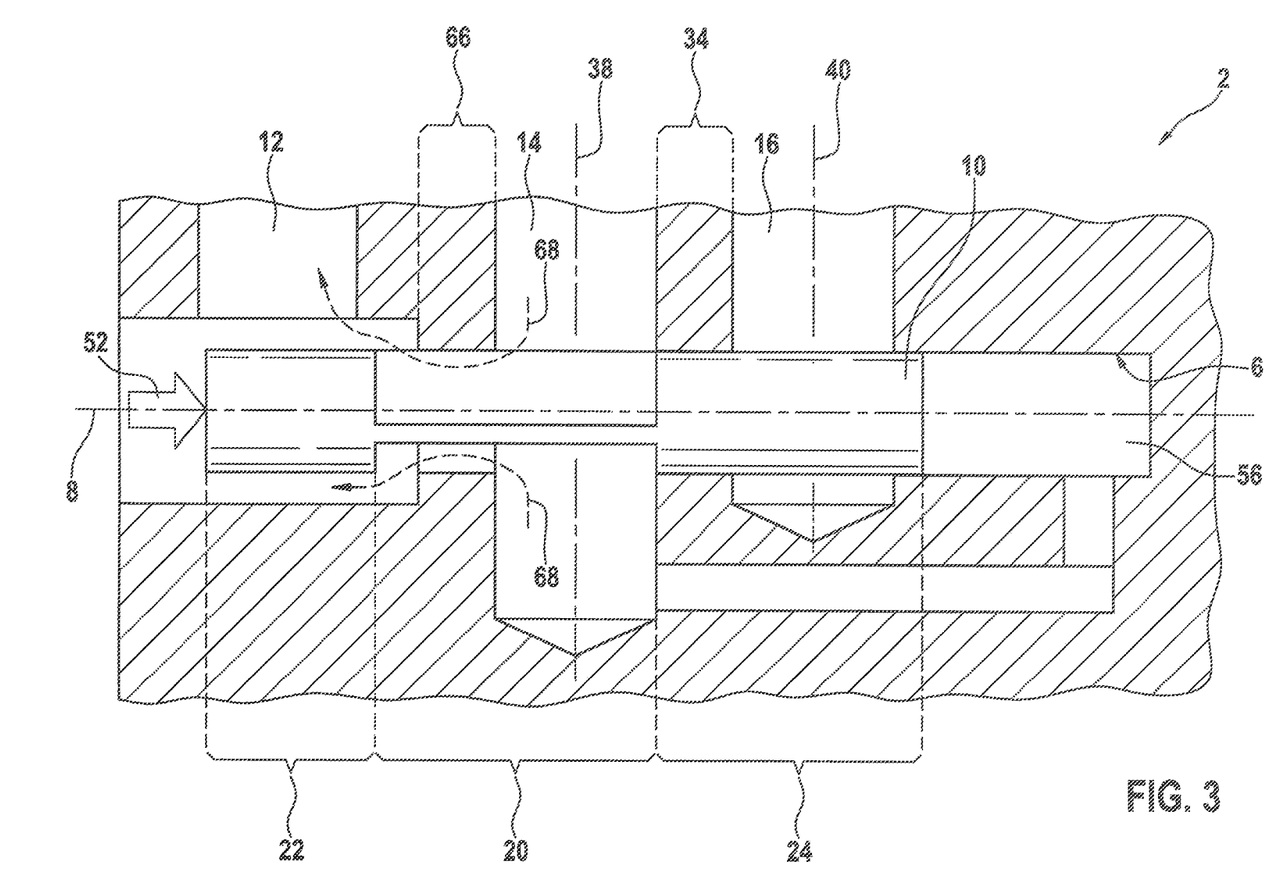
FIG. 3 schematically shows a sectional view of the slide valve from FIG. 1 in a pressure-reduction position.

FIG. 3 schematically shows a sectional view of first slide valve 2 in a pressure-reduction position. In the pressure reduction position of valve slide 10, fluid may flow out of operating pressure-connecting channel 14 into tank-connecting channel 12 in accordance with arrows 68. The pressure-reduction position, like the pressure buildup position, corresponds to an opened slide position. In the pressure-reduction position shown, valve slide 10 establishes a fluid connection between two adjacent connecting channels 12 and 14, and at the same time valve slide 10 is guided in section 66 of sliding channel 6.

Figure 4:
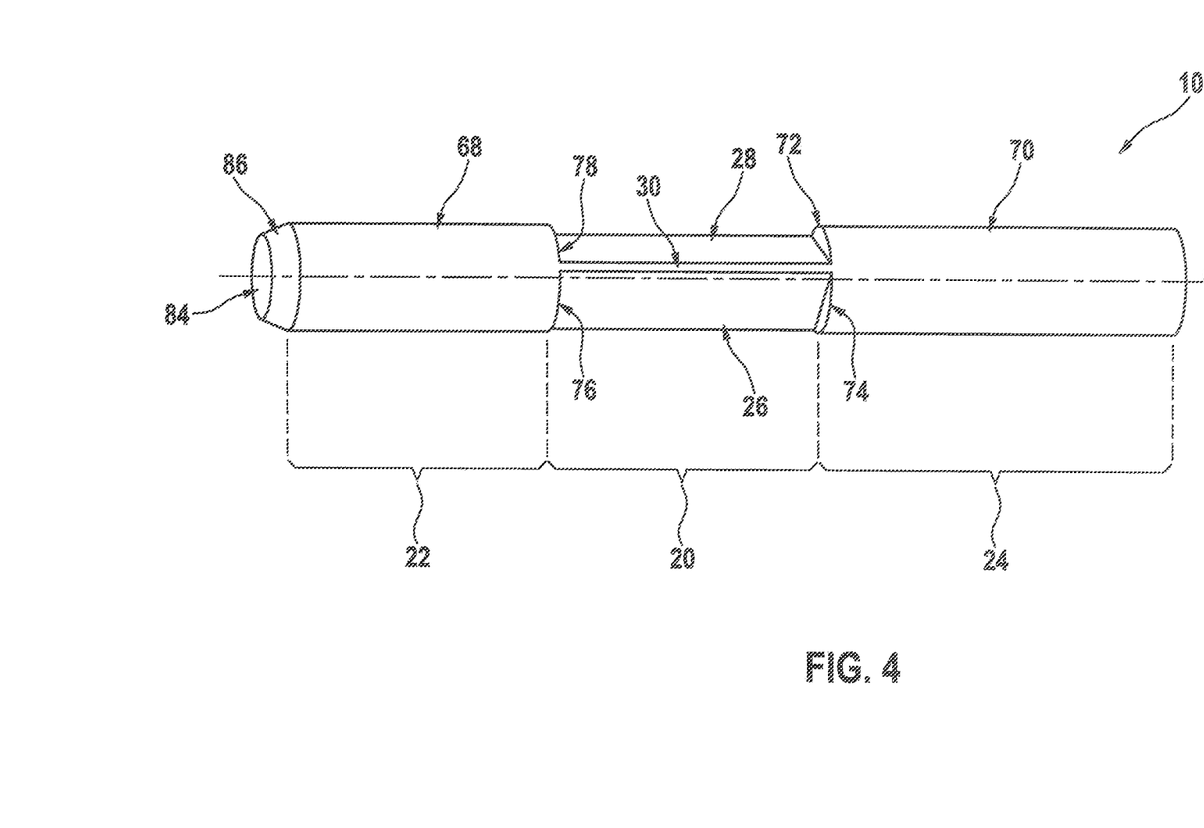
FIG. 4 shows a perspective view of a valve slide.

FIG. 4 schematically shows valve slide 10 from FIGS. 1 through 3 in a perspective view. Longitudinal axis 8 of sliding channel 6, which also represents the longitudinal axis of valve slide 10, is plotted. Closing sections 22 and 24 each include guide outer surfaces 68 and 70, which are formed essentially for guiding in sliding channel 6 and for sealing sliding channel 6. It is understood that guide outer surfaces 68 and 70 may be interrupted, for example, by pressure relief grooves, to the extent that the aforementioned guide function and sealing function are essentially not adversely affected.

Guide section 30, which essentially includes a guide outer surface which is essentially uninterrupted, is shown in opening section 20. However, the guide outer surface of guide section 30 may, for example, be interrupted by a pressure relief groove, to the extent that its guide function, in particular, in sections 34 and 66 of sliding channel 6, is not adversely affected. Valve slide 10 includes guide section 30 in opening section 20, guide section 30 transitioning essentially continuously into respective guide outer surfaces 68 and 70 of closing sections 22 and 24.

Cross-sectional rebounds 26 and 28 are joined to guide section 30 in cross section and are configured to be essentially flat. It is understood that, instead of the flat configuration, a convex or concave shape of cross sectional rebounds 26 and 28 may also be chosen.

Control edges 72 and 74 are formed by cross-sectional rebounds 26 and 28 between opening section 20 and closing section 24. Control edges 76 and 78 are formed between opening section 20 and closing section 22. Control edges 72 through 78 have an essentially circular segment line shape, a corresponding circular surface being aligned essentially transversely to longitudinal axis 8. A front face 84 is aligned in the direction of arrow 52 and, therefore, in the direction of the actuator. Valve slide 10 has a conically shaped surface 86 tapering toward front face 84 between front face 84 and closing section 22.

Figure 5:
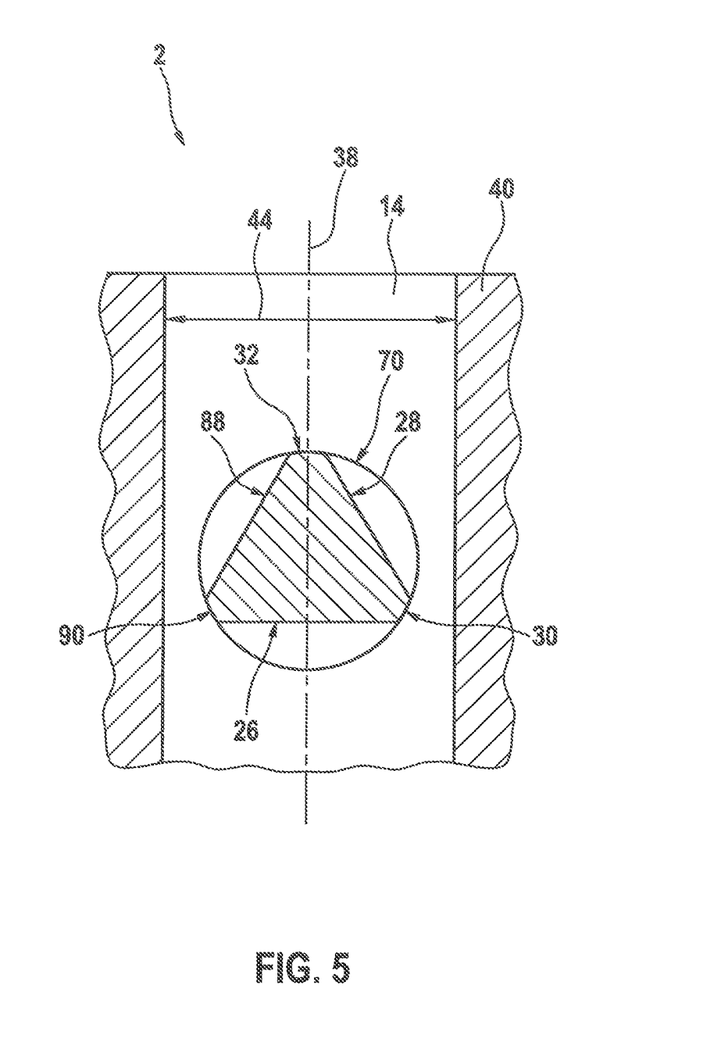
FIG. 5 schematically shows a cross-sectional view of the slide valve from FIG. 1.

FIG. 5 shows a cross-sectional view in sections of first slide valve 2 in accordance with a cross-sectional surface through longitudinal axis 8 and through longitudinal axis 38 of operating pressure-connecting channel 14 according to FIG. 1, in particular from a direction in accordance with arrow 52. Valve 10, together with a cross-sectional rebound 88 and an additional guide section 90, has an essentially triangular cross sectional shape in the area of opening section 20. Guide sections 30, 32 and 90 are formed in accordance with each corresponding inner surface of sliding channel 6. Cross sectional rebounds 28, 88 and 26 extend counterclockwise between guide sections 30, 32 and 90. The cross section of opening section 20 of valve slide 10 has an axial symmetry relative to axis 38. In addition, the cross section of opening section 20 of valve slide 10 has a rotational symmetry, in which a circular segment of 120° may be reproduced in degrees on another circular segment of 120° in degrees by a rotation about a cross-sectional center point situated on longitudinal axis 8.

Cross-sectional rebound 88 in the cross section of valve slide 10 is spaced essentially equally far apart from cross-sectional rebound 28 in the circumferential direction as it is to cross sectional rebound 26. A guide section 30 is also spaced essentially equally far apart in the circumferential direction from guide section 90 as it is from guide section 32. Cross-sectional rebounds 26, 28 and 88 each serve to establish a fluid connection in the opened slide position in one of sections 34 and/or 66 of sliding channel 6 between adjacent connecting channels 12 and 14 or 14 and 16.

Figure 6:
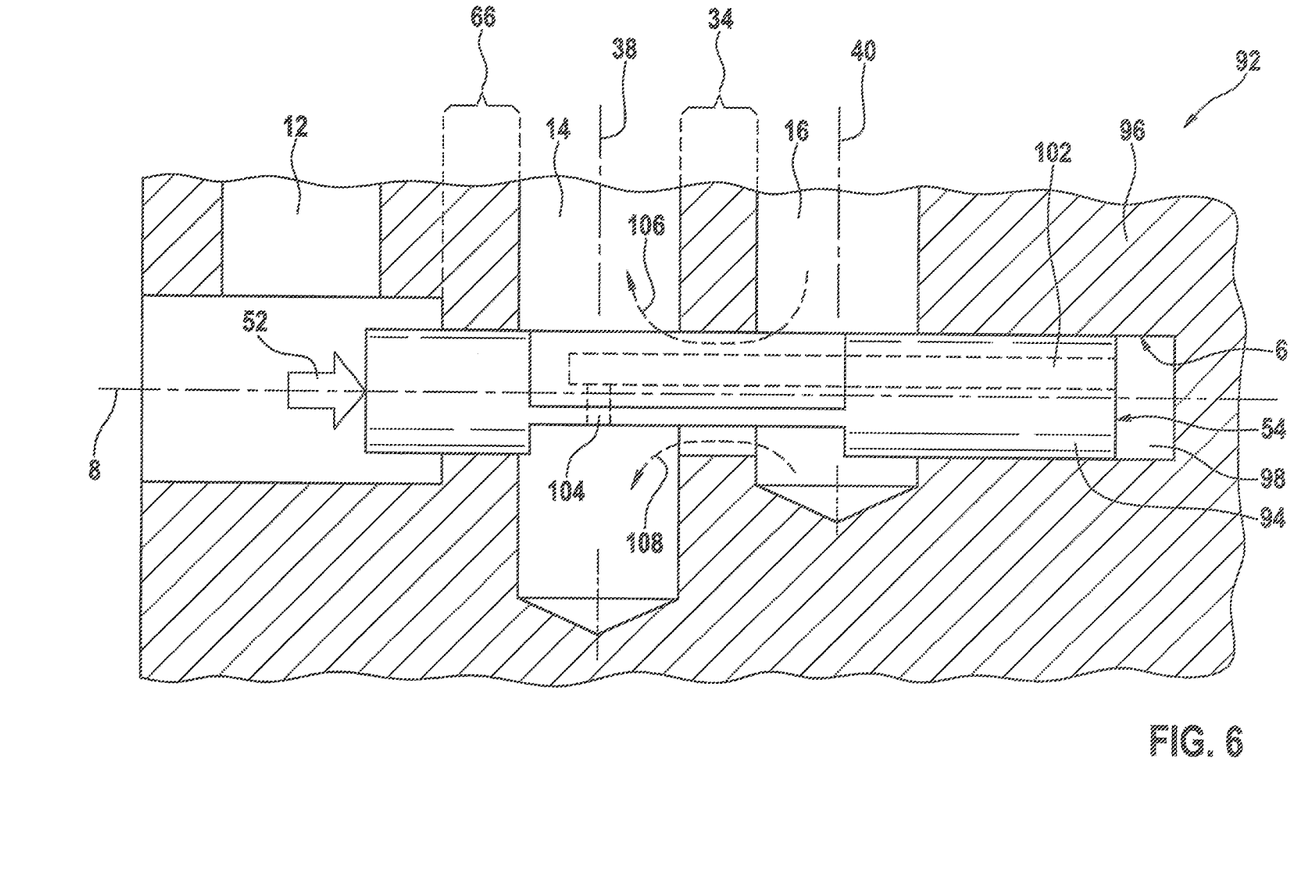
FIG. 6 schematically shows a sectional view of a second slide valve.

FIG. 6 schematically shows a sectional view of a second slide valve 92, which includes a valve slide 94, in contrast to first slide valve 2 from FIGS. 1 through 3. A housing 96 of second slide valve 92, in contrast to housing 4 of first slide valve 2, includes no connection between connecting channels 14 and 16.

A pressure chamber 98 is delimited essentially by sliding channel 6 and front surface 54 of valve slide 94. A longitudinal bore 102 and a transverse bore 104 always establish a fluid connection between operating pressure-connecting channel 14 and pressure chamber 98. A pressure may be applied via pressure chamber 98 to front surface 54 of valve slide 94 facing away from the actuator for valve slide 94 counter to the direction of arrow 52 and, therefore, counter to the actuator operating direction. Longitudinal bore 102 opens into pressure chamber 98 and transverse bore 104, which is connected to longitudinal bore 102 to form a fluid connection, opens into operating pressure-connecting channel 14 in the pressure build-up position in the area of opening section 20. In accordance with arrows 106 and 108, fluid flows from pressure supply-connecting channel 16 into operating pressure-connecting channel 14 in the pressure buildup position shown.

Figure 7:
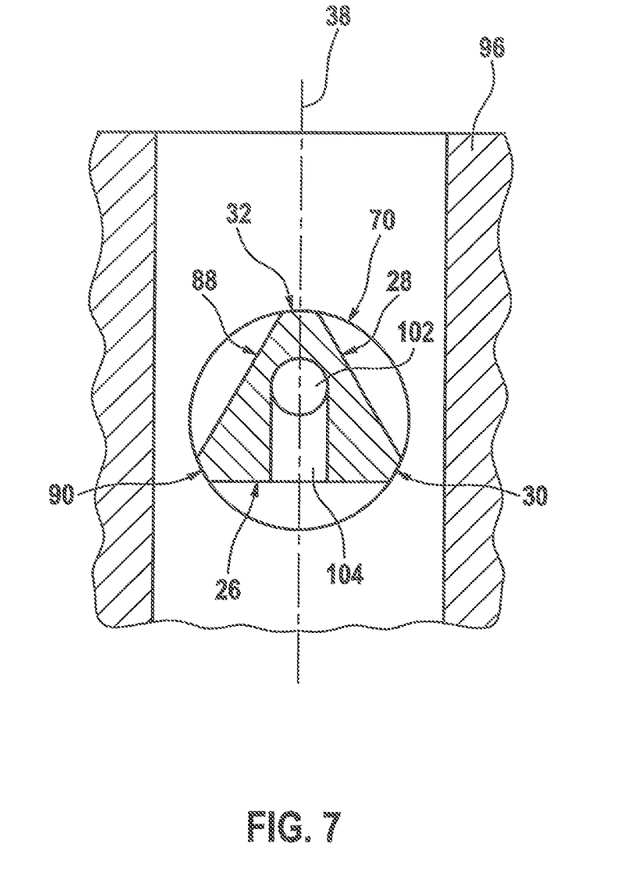
FIG. 7 schematically shows a cross-sectional view of the second slide valve from FIG. 6.

FIG. 7 shows a sectional view similar to FIG. 5 in accordance with a cross-sectional surface to longitudinal axis 8 through axis 38. Transverse bore 104 is implemented without a flat face.

Figure 8:
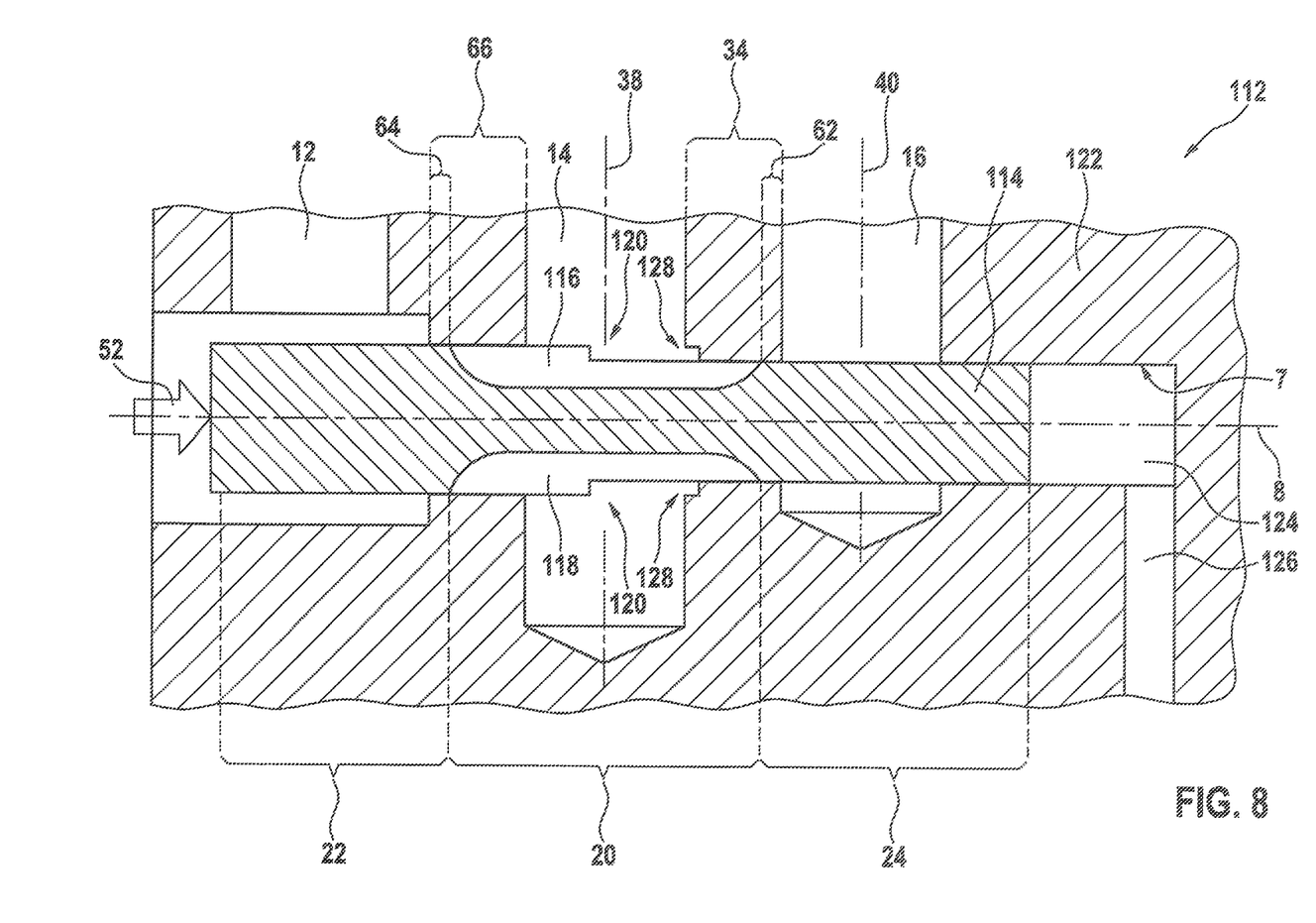
FIG. 8 schematically shows a sectional view of a third slide valve.

FIG. 8 schematically shows a sectional view of a third slide valve 112 in a closed position. A valve slide 114 is shown in a sectional view, in contrast to FIGS. 1, 2, 3 and 6. In opening section 20, valve slide 114 includes cross-sectional rebounds 116 and 118. Valve slide 114 has an abrupt diameter change 120 along longitudinal axis 8, which is formed as a circular edge, explained in greater detail with reference to FIG. 9. A housing 122 of third slide valve 112 includes a sliding channel 7 corresponding to abrupt diameter change 120, which has a larger diameter in section 66 than in section 34. Sliding channel 7 and valve slide 114 are configured in such a way that valve slide 114 in the opened slide position, not shown in FIG. 8, establishes a fluid connection between two adjacent connecting channels 12 and 14 or 14 and 16, and valve slide 114 in the opened position is guided into a section 34 and/or a section 66 of sliding channel 7 between adjacent connecting channels 14 and/or 16.

A chamber 124 is delimited essentially by sliding channel 7 and a front surface of valve slide 114, which is aligned counter to the actuator not shown. Chamber 124 is connected to a fluid tank or to tank-connecting channel 12 via a duct 126 in a form not shown. The required restoring force counter to arrow 52 is produced with the aid of diameter change 120. In addition, housing 122 includes a recess 128 in section 34, which corresponds to diameter change 120. Recess 128 may serve, in particular, as a stop element for diameter change 120.

Figure 9:
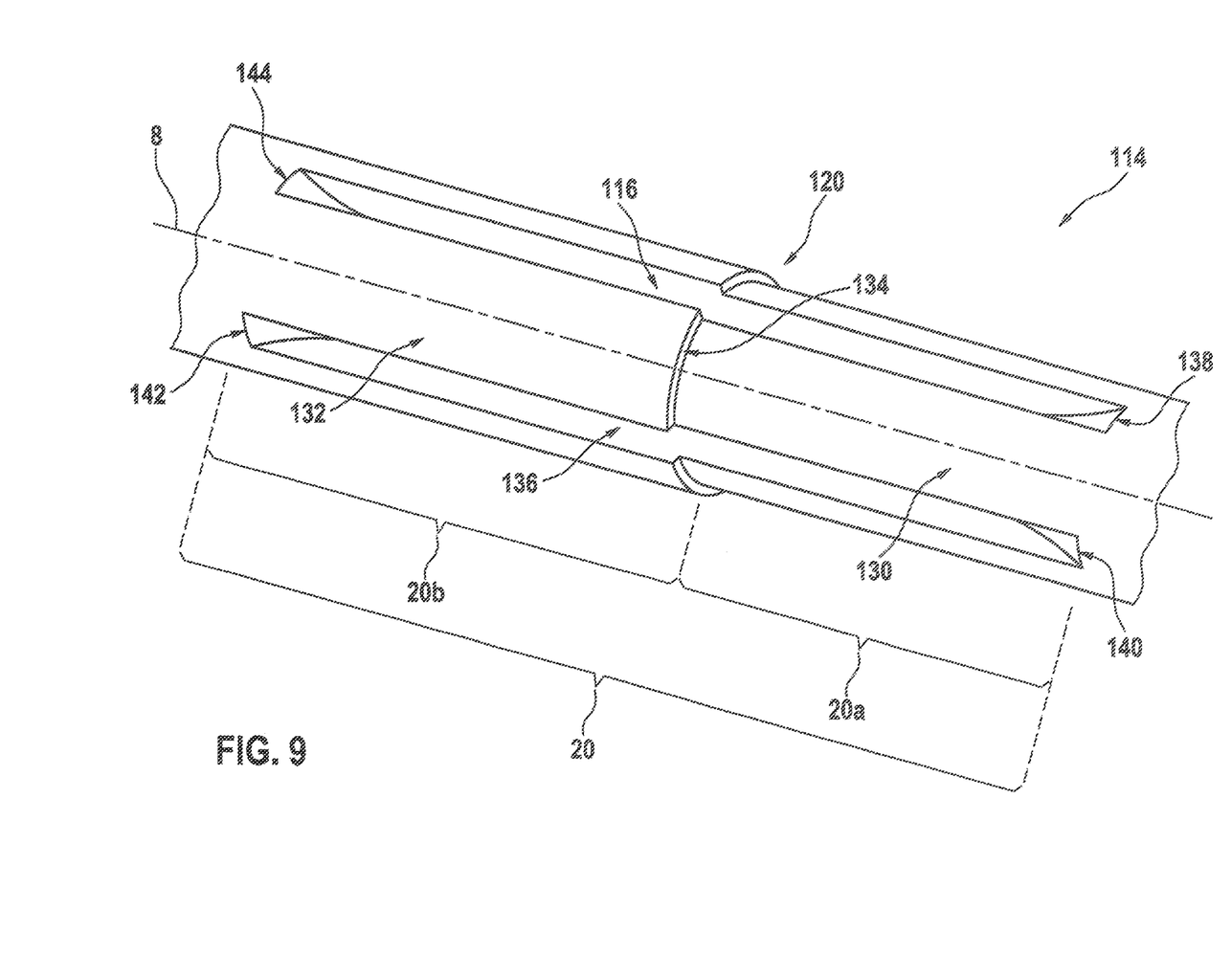
FIG. 9 schematically shows a perspective view of a detail of another valve slide.

FIG. 9 shows a perspective view of opening section 20 of valve slide 114. Opening section 20 is divided into a first opening section 20a and a second opening section 20b. First opening section 20a, together with adjoining closing section 24 lying opposite to diameter change 120, has a smaller diameter than second opening section 20b having adjoining closing section 22 lying opposite diameter change 120. A guide section 130 for guiding valve slide 114 in section 34 transitions continuously into closing section 24 in the area of first opening section 20a. In second opening section 20b, a guide section 132 transitions continuously into closing section 22.

Four partial annular surfaces, such as partial annular surface 134, which is formed in accordance with an abrupt diameter change essentially transversely to longitudinal axis 8 of valve slide 114, are formed in the area of diameter change 120. A normal vector of partial annular surface 134 is aligned essentially counter to the arrangement of an actuator for valve slide 114.

A cross-sectional rebound 116 and a cross-sectional rebound 136 are situated on both sides of guide section 130 in the circumferential direction, as well as on both sides of guide section 132 in the circumferential direction. Cross-sectional rebounds 116 and 136 extend in the longitudinal direction beyond diameter change 120 and form control edges 138, 140, 142 and 144 at both ends of opening section 20. As shown in FIGS. 8 and 9, cross-sectional rebounds 116 and 136, as well as 118, are formed concavely, i.e., with an inward curvature toward longitudinal axis 8, starting from respective control edges 144 and 138, as well as 142 and 140. Opening section 20 of valve slide 114 includes in cross section four cross-sectional rebounds and four guide sections. It is understood that valve slide 114 may also include more than four cross-sectional rebounds, in particular six, eight or ten or even more cross-sectional rebounds. It is understood that valve slide 114 may also include more than four guide sections, in particular six, eight, or ten or even more guide sections. These cross sectional rebounds and/or guide sections may, in particular, be situated in such a way that essentially a point symmetry relative to a cross-section center point of valve slide 114 results in the cross section of the valve slide 114, the cross-section center point lying on the longitudinal axis 8.

Figure 10:
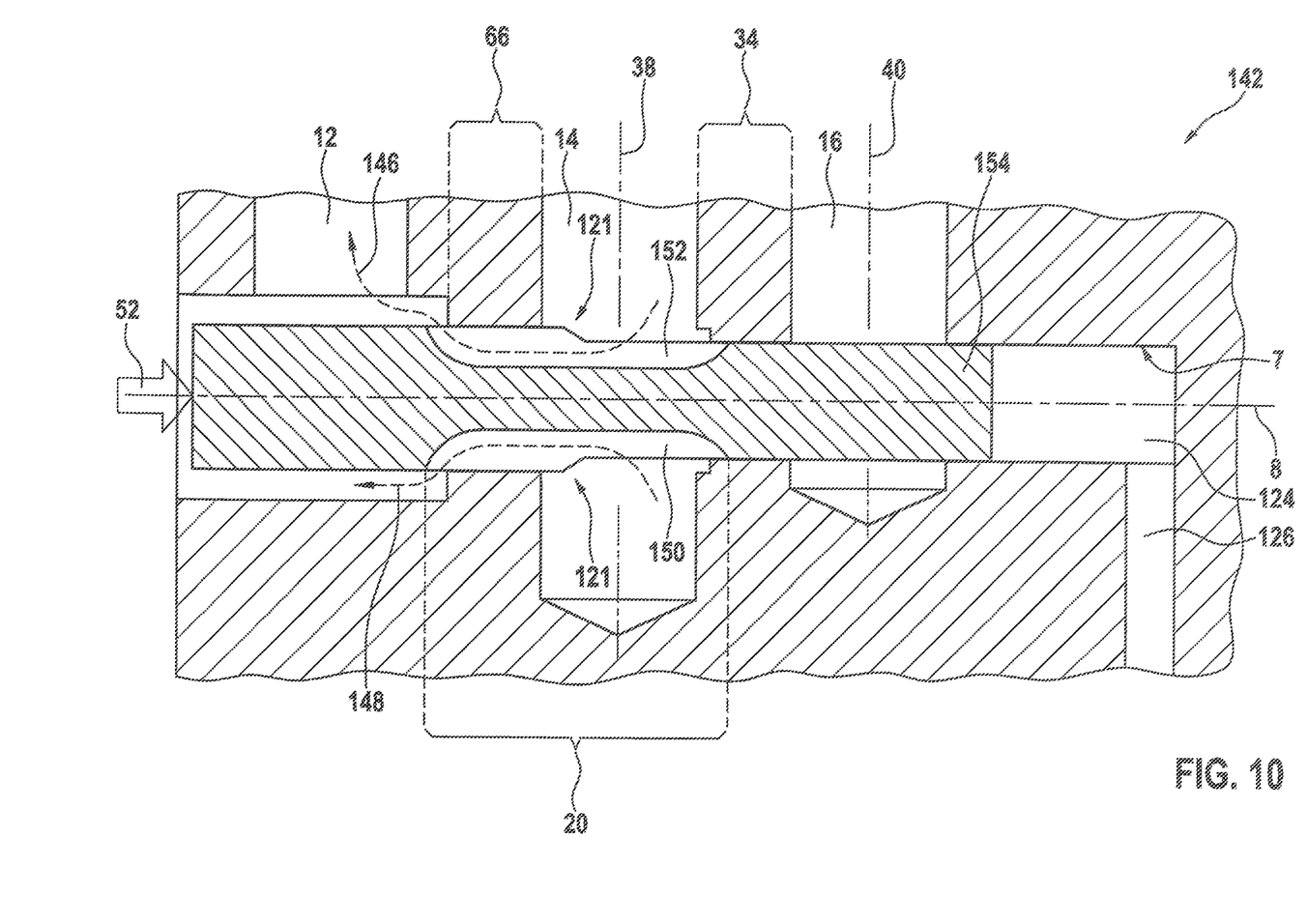
FIG. 10 schematically shows a sectional view of a fourth slide valve.

FIG. 10 shows a fourth slide valve 142 in the pressure-reduction position. Fluid may flow from operating pressure-connecting channel 14 into tank-connecting channel 12 via cross-sectional rebounds 150 and 152 in accordance with arrows 146 and 148.

Valve 154 has a diameter change 121 in opening section 20, which is slanted, in contrast to diameter change 120 according to FIGS. 8 and 9. Diameter change 121 according to FIG. 10 is discontinuously implemented. Continuous implementations of diameter change 121 may also be chosen, however. On the whole, it is possible to set a desired restoring force counter to the actuator force by the choice of the diameter difference in the area of diameter change 120.

It is understood that valve slide 154 also includes guide sections analogous to guide sections 130 and 132 of valve slide 114.

What is claimed is:
1. A slide valve, comprising:
a valve slide which is displaceable in a sliding channel and two adjacent connecting channels;
wherein the sliding channel and the valve slide are configured so that the valve slide in an opened slide position establishes a fluid connection between the two adjacent connecting channels, and
wherein the valve slide in the opened slide position is guided in a section of the sliding channel between the adjacent connecting channels;
wherein an opening section of the valve slide for the opened slide position of the valve slide has a diameter change, which is situated in the longitudinal direction of the valve slide away from a control edge of the opening section; and
wherein the diameter change of the valve slide forms a partial annular surface, which is aligned as to the longitudinal direction of the valve slide, at least one component of a normal vector of the partial annular surface being aligned essentially counter to the arrangement of an actuator for the valve slide.

2. The slide valve of claim 1, wherein an opening section of the valve slide for the opened slide position includes a cross sectional rebound to the fluid connection in the section of the sliding channel between the adjacent connecting channels.

3. The slide valve of claim 2, wherein the opening section of the valve slide for the opened slide position includes a guide section for guiding the valve slide in the sliding channel, and the guide section transitioning essentially continuously into a guide outer surface of an adjacent closing section of the valve slide.

4. The slide valve of claim 2, wherein a first-cross sectional rebound in the cross section of the valve slide is spaced essentially equally far apart from a second cross-sectional rebound adjacent to the first cross-sectional rebound in the circumferential direction as it is to a third cross-sectional rebound adjacent to the first cross-sectional rebound, and/or a first guide section in the cross section of the valve slide is spaced essentially equally far apart from a second guide section adjacent to the first guide section in the circumferential direction, as it is to a third guide section adjacent to the first guide section.

5. The slide valve of claim 2, wherein guide sections and/or cross-sectional rebounds in the cross section of the valve slide have essentially a point symmetry relative to a cross-section center point of the valve slide and/or an axial symmetry relative to a symmetry axis through the cross-section center point of the valve slide.

6. The slide valve of claim 1, wherein one of the connecting channels transverse to a longitudinal axis of the sliding channel has a diameter larger than the cross-sectional diameter of a section of the sliding channel adjacent to the connecting channel.

7. The slide valve of claim 1, wherein the valve slide includes a passage, which establishes a fluid connection between an operating pressure-connecting channel and a pressure chamber in a pressure buildup position of the valve slide, a pressure capable of being applied via the pressure chamber to a front surface of the valve slide facing away from an actuator for the valve slide.

8. The slide valve of claim 1, wherein a housing of the slide valve includes a passage which establishes a fluid connection between an operating-pressure connecting channel and a pressure chamber, a pressure capable of being applied via the pressure chamber to a front surface of the valve slide facing away from an actuator for the valve slide.

9. The slide valve of claim 1, wherein the slide valve is for an automatic transmission for a motor vehicle.

10. A slide valve, comprising:
a valve slide which is displaceable in a sliding channel and two adjacent connecting channels;
wherein the sliding channel and the valve slide are configured so that the valve slide in an opened slide position establishes a fluid connection between the two adjacent connecting channels; and
wherein the valve slide in the opened slide position is guided in a section of the sliding channel between the adjacent connecting channels;
wherein an opening section of the valve slide for the opened slide position of the valve slide has a diameter change, which is situated in the longitudinal direction of the valve slide away from a control edge of the opening section; and wherein the diameter change of the valve slide forms a partial annular surface, which is aligned essentially transversely to the longitudinal direction of the valve slide, at least one component of a normal vector of the partial annular surface being aligned essentially counter to the arrangement of an actuator for the valve slide.

11. The slide valve of claim 10, wherein an opening section of the valve slide for the opened slide position includes a cross sectional rebound to the fluid connection in the section of the sliding channel between the adjacent connecting channels.

12. The slide valve of claim 11, wherein the opening section of the valve slide for the opened slide position includes a guide section for guiding the valve slide in the sliding channel, and the guide section transitioning essentially continuously into a guide outer surface of an adjacent closing section of the valve slide.

13. The slide valve of claim 11, wherein a first-cross sectional rebound in the cross section of the valve slide is spaced essentially equally far apart from a second cross-sectional rebound adjacent to the first cross-sectional rebound in the circumferential direction as it is to a third cross-sectional rebound adjacent to the first cross-sectional rebound, and/or a first guide section in the cross section of the valve slide is spaced essentially equally far apart from a second guide section adjacent to the first guide section in the circumferential direction, as it is to a third guide section adjacent to the first guide section.

14. The slide valve of claim 11, wherein guide sections and/or cross-sectional rebounds in the cross section of the valve slide have essentially a point symmetry relative to a cross-section center point of the valve slide and/or an axial symmetry relative to a symmetry axis through the cross-section center point of the valve slide.

15. The slide valve of claim 10, wherein one of the connecting channels transverse to a longitudinal axis of the sliding channel has a diameter larger than the cross-sectional diameter of a section of the sliding channel adjacent to the connecting channel.

16. The slide valve of claim 10, wherein the valve slide includes a passage, which establishes a fluid connection between an operating pressure-connecting channel and a pressure chamber in a pressure buildup position of the valve slide, a pressure capable of being applied via the pressure chamber to a front surface of the valve slide facing away from an actuator for the valve slide.

17. The slide valve of claim 10, wherein a housing of the slide valve includes a passage which establishes a fluid connection between an operating-pressure connecting channel and a pressure chamber, a pressure capable of being applied via the pressure chamber to a front surface of the valve slide facing away from an actuator for the valve slide.

18. The slide valve of claim 10, wherein the slide valve is for an automatic transmission for a motor vehicle.

* * * * *